United States Patent Office 3,469,322
Patented Sept. 30, 1969

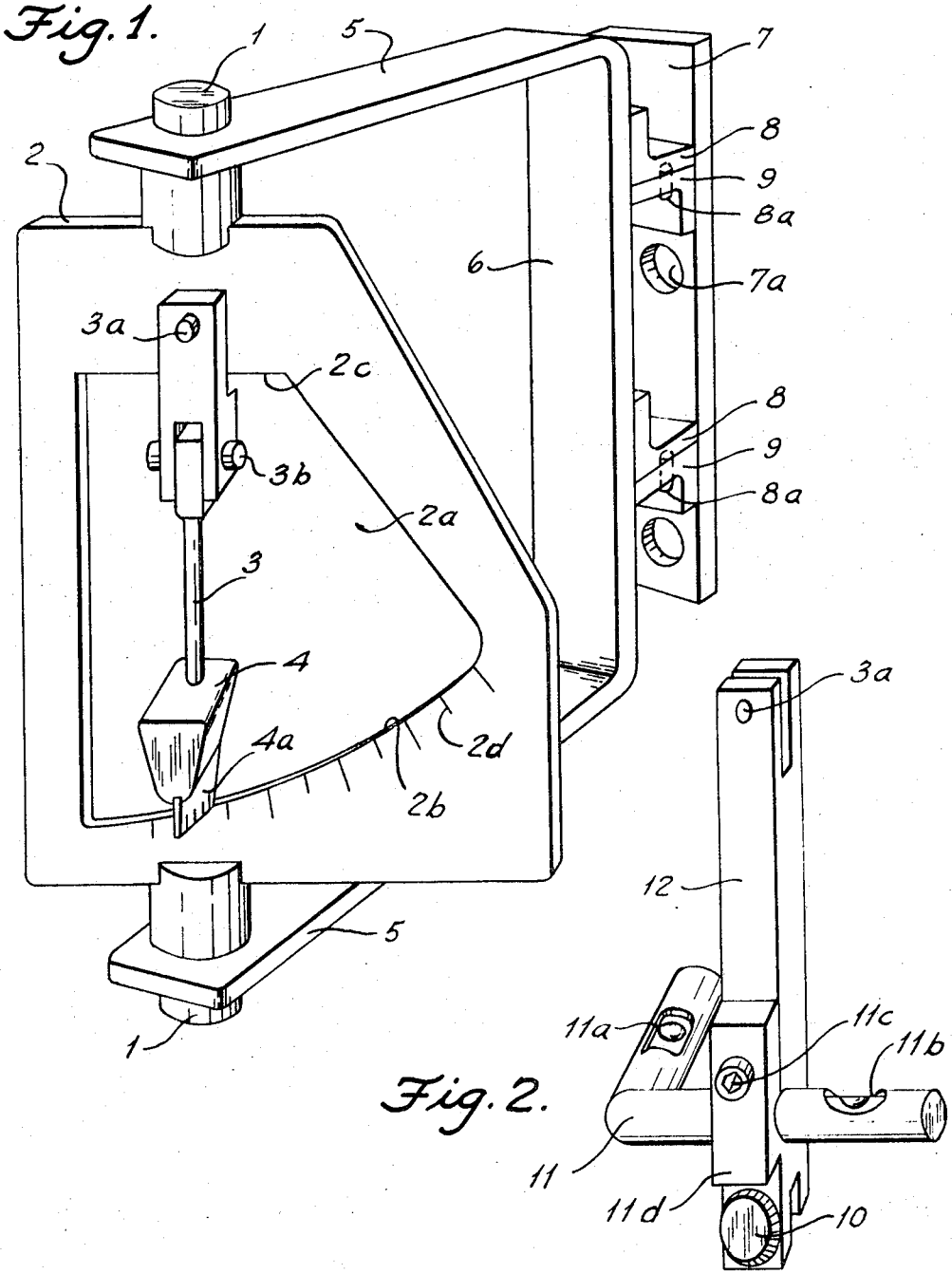

3,469,322
INCLINOMETER FOR A ROCK DRILLING
MACHINE
Bengt Gosta Eriksson, Bygardesvagen 3,
Spanga, Sweden
Filed June 7, 1967, Ser. No. 644,384
Int. Cl. G01c 9/12, 9/16
U.S. Cl. 33—215                                1 Claim

ABSTRACT OF THE DISCLOSURE

An instrument for adjusting the inclination or angular position or an inclinometer of specific design for facilitating proper angular adjustment of a device such as for instance a feeding mechanism or other part of a rock drilling machine comprises a pendulum having two degrees of freedom of motion mounted to pivot around an axis orthogonal to the two degrees of freedom in an aperture in a body carrying a graduated arc. A scale on the arc body and a second scale at the bottom of the pendulum indicate the inclination of the rock drilling machine or any other device to which the inclinometer is secured.

BACKGROUND OF THE INVENTION

As stated above, the invention refers to an inclinometer or instrument for the adjusting of the angular position of for instance feeding mechanism for rock drilling machines. The inclinometer may also be utilized for adjusting other objects such as masts, towers or the like.

In drilling operations with rock drilling machines considerable difficulty is often encountered in measuring and adjusting the inclination of the drill in the machine. Miscellaneous devices of simple character are generally used in this connection, but known constructions of this type do not provide the required precision or accuracy.

SUMMARY OF THE INVENTION

The main object of the invention is to provide an inclinometer or angle-adjusting instrument which is simple and cheap to manufacture and may be handled easily and also will furnish the desired correct precision for successful drilling results. The instrument is substantially characterized by a body to be mounted in essentially vertical position and carrying a graduated arc or scale, said body being turnable around a substantially vertical axis and provided with a preferably central aperture or recess that is graduated along its lower edge, a pendulum having two degrees of freedom of movement being suspended at the top portion of the graduated arc body and mounted to pivot freely around an axis orthogonal to the two degrees of freedom in said aperture or recess of the graduated arc body, a graduated disc provided at the lower portion of said pendulum being oriented at right angles to said graduated arc or scale and positioned slightly above said graduated arc or scale of said body. According to a modified embodiment of the invention the pendulum may be replaced by a vertical bar mounted pivotally at or adjacent to the top edge of the aperture of the graduated arc body, said bar being provided at its lower end with an angular level positioned slightly above the graduated arc or scale of the graduated arc body and adapted to be clamped in different positions by means of securing means such as a screw or the like.

BRIEF DESCRIPTION OF THE DRAWING

The invention will now be described more in detail with reference to the accompanying drawing, in which FIGURE 1 shows a perspective view of one embodiment of the inclinometer with a pendulum, and FIGURE 2 shows a bar with an angular level.

According to the drawing a body 2 having a scale or graduated arc 2d is mounted to turn around a vertical axis through two studs 1 aligned with each other on opposite sides of the legs 5 of a U-shaped frame provided with a top leg and a lower leg. A built-in friction device is mounted between said studs 1 and their bearings in the legs 5. The body 2 has a central recess or aperture 2a, the bottom edge 2b of which is shaped as an arc and provided with said scale or graduation 2d. A pendulum 3 is suspended at the top edge 2c of the aperture 2a of said body 2 and is capable of swinging back and forth in an infinite number of planes by means of pivots 3a and 3b at right angles to each other. At its lower portion the pendulum carries an elongated weight 4 situated slightly above the bottom graduated edge 2b of the aperture 2a of said body 2. The weight has its greatest longitudinal extension at right angles to the longitudinal extension of said bottom edge 2b of the aperture 2a. A graduated arc or scale disc 4a extending in the longitudinal direction of the weight is attached to the bottom thereof.

Angle irons 8 are secured to the respective top and bottom parts of the external vertical portion of the frame 6 and the lower portions of said angle irons 8 are provided with depending guiding pins 8a. The frame 6 is adapted to be secured to a vertical mounting plate 7, which at its side facing said frame 6 is provided with angle irons 9 corresponding to the angle irons 8 of the frame 6. Each of the angle irons 9 has a boring aligned with the pin 8a of the associated angle iron 8 of the frame 6 so as to receive said pin depending from the angle iron 8. The mounting plate 7 is also provided with borings 7a for mounting the inclinometer on the feeding device of a rock drilling machine (not shown) by means of bolts or screws (not shown) extending through said borings 7a.

In using the instrument or inclinometer according to the invention the instrument is mounted to a desired part of a rock drilling machine by bolting the mounting plate 7 to said part, for example the feeding device of the rock drilling machine to be angularly adjusted, and then the frame 6 is hooked onto the mounting plate 7 by fitting the guiding pins 8a into the borings provided in the angle irons 9 of the mounting plate 7.

The body 2 having the graduated arc scale 2d is now pivoted around the pivots 1 until the body 2 is in a vertical plane parallel to or coinciding with the vertical plane through the longitudinal axis of the feeding device or the rock drill. The inclination of the feeding device or of the rock drill may now be read on the graduated scale or arc 2d according to the deviation or deflection of the pendulum 3. At the same time also the inclination in a vertical plane normal to the first vertical plane may be read on the scale 4a of the pendulum 4. The angular position of the feeding device or rock drill may now be easily adjusted to the proper value as desired.

In a modified embodiment of the inclinometer shown in FIG. 2 the weight 3 is replaced by a vertical bar 12 intended to be pivotally suspended at the top edge 2c of the aperture 2a of the graduated arc body 2 by means of pivot 3a in substantially the same manner as the pendulum 3 in FIG. 1. At its lower end the bar 12 carries an angular support 11 with levels 11a, 11b positioned slightly above the graduated scale 2d at the lower edge 2b of the body 2 shown in FIG. 1. The support 11 carries one level 11a, 11b at each branch and said branches are perpendicular to one another. The bar 12 with its angular branches 11a, 11b may be clamped in register with a selected one of the graduation markings 2d by means of a screw 10.

The angular support 11 may be clamped adjustable to the bar 12 by means of a clamping block 11d and a screw 11c. This arrangement enables displacement of branch 11b in relation to bar 12 in axial direction of branch 11b.

In using the embodiment according to FIGURE 2 the bar 12 is clamped by means of screw 10 to the selected marking of the graduated scale 2d, said marking indicating the desired inclination of the feeding mechanism or other object to which plate 7 is secured. The whole assembly including the inclinometer and said feeding mechanism or object is now swung or turned until both levels 11a, 11b indicate horizontal levels. The feeding mechanism or object now has the desired inclination.

The invention is not restricted to the illustrated and described embodiment, but may be modified in several respects. For instance, the suspension of the weight 3 at the top edge of the aperture 2c in a manner so as to admit pivoting in planes at right angles to each other, may be replaced by suspension means with a needle point. In the modified embodiment the angular level may be replaced by a circular cup-shaped level with graduations.

What I claim is:

1. An inclinometer for adjusting the angular position or inclination of the feeding mechanism of rock drilling machines, comprising in combination a pendulum, a flat body carrying said pendulum and normally occupying a substantially vertical position, a frame, a first pivot for mounting said body in said frame to pivot around an essentially vertical axis, said body comprising a recess having along its lower edge a first scale graduated in inclination units, a second pivot with horizontal orientation for suspending said pendulum at the top portion of said recess so as to allow the pendulum to swing in the general plane of said recess, a third pivot likewise oriented horizontally but extending at substantially right angles to said second pivot and pivoting said pendulum to swing in planes perpendicular to the general recess plane a second scale graduated in inclination units arranged normal to said general or main plane of said recess to indicate the swinging angle of said pendulum when swinging in said normal plane, the lower end of said pendulum being freely swingable above said first graduated scale perpendicularly thereto, means for mounting said inclinometer to said feeding mechanism and attachment means for securing said frame to said mounting means in a predetermined position.

References Cited

UNITED STATES PATENTS

| 204,133 | 5/1878 | Chandler | 33—215.2 |
|---|---|---|---|
| 2,541,366 | 2/1951 | Kennedy | 33—207 |
| 2,659,975 | 11/1953 | Van Gundy | 33—213 XR |

LEONARD FORMAN, Primary Examiner

DENNIS A. DEARING, Assistant Examiner

U.S. Cl. X.R.

33—207, 213